US010184678B2

United States Patent
Lee et al.

(10) Patent No.: US 10,184,678 B2
(45) Date of Patent: Jan. 22, 2019

(54) SYSTEM AND METHOD FOR MEASURING DUCT LEAKAGE IN A HVAC SYSTEM

(71) Applicant: Carrier Corporation, Farmington, CT (US)

(72) Inventors: Jun Pyo Lee, Zionsville, IN (US); Daniel J Dempsey, Carmel, IN (US)

(73) Assignee: CARRIER CORPORATION, Farmington, CT (US)

( * ) Notice: Subject to any disclaimer, the term of this patent is extended or adjusted under 35 U.S.C. 154(b) by 673 days.

(21) Appl. No.: 14/317,355

(22) Filed: Jun. 27, 2014

(65) Prior Publication Data

US 2015/0073732 A1    Mar. 12, 2015

Related U.S. Application Data

(60) Provisional application No. 61/874,607, filed on Sep. 6, 2013.

(51) Int. Cl.
| | |
|---|---|
| *F24F 7/007* | (2006.01) |
| *F24F 7/04* | (2006.01) |
| *F24F 7/08* | (2006.01) |
| *F24F 13/02* | (2006.01) |
| *F24F 11/00* | (2018.01) |
| *G01M 3/28* | (2006.01) |

(52) U.S. Cl.
CPC ............... *F24F 7/04* (2013.01); *F24F 7/007* (2013.01); *F24F 7/08* (2013.01); *F24F 11/0001* (2013.01); *F24F 13/02* (2013.01); *G01M 3/2815* (2013.01)

(58) Field of Classification Search
CPC ...... F24F 7/007; F24F 7/04; F24F 7/08; F24F 11/0001; F24F 13/02; G01M 3/02

USPC .......................................................... 702/50
See application file for complete search history.

(56) References Cited

U.S. PATENT DOCUMENTS

| | | |
|---|---|---|
| 5,817,950 A | 10/1998 | Wiklund et al. |
| 5,861,546 A | 1/1999 | Sagi et al. |
| 5,866,802 A | 2/1999 | Kimata et al. |
| 5,980,984 A | 11/1999 | Modera et al. |
| 6,116,095 A | 9/2000 | Radle |
| 6,226,568 B1 | 5/2001 | Tong et al. |
| 6,439,061 B1 * | 8/2002 | Nelson ............... G01F 1/46 73/861.65 |
| 6,719,625 B2 | 4/2004 | Federspiel |
| 6,820,501 B2 | 11/2004 | Roesler et al. |
| 6,854,318 B2 | 2/2005 | Sagi et al. |
| 6,928,884 B1 | 8/2005 | Pearson |

(Continued)

FOREIGN PATENT DOCUMENTS

| | | |
|---|---|---|
| WO | WO2005073638 A1 | 8/2005 |
| WO | WO2006016989 A1 | 2/2006 |
| WO | WO2005072122 A2 | 8/2015 |

*Primary Examiner* — Bryan Bui
(74) *Attorney, Agent, or Firm* — Cantor Colburn LLP

(57) ABSTRACT

A system and method of measuring duct leakage in an HVAC system including an indoor unit assembly operably coupled to a processing device, wherein at least one supply air conduit, and at least one return air conduit are coupled to the indoor unit assembly by operating a blower system at a nominal airflow rate, restricting airflow in each of the at least one supply air conduits, and each of the at least one return air conduits; operating the blower system, within the indoor unit assembly, at a first airflow rate; and operating the processing device to calculate a duct leakage airflow and duct leakage measurement.

25 Claims, 3 Drawing Sheets

(56) References Cited

U.S. PATENT DOCUMENTS

| | | |
|---|---|---|
| 6,964,174 B2 | 11/2005 | Shah |
| 6,994,620 B2 | 2/2006 | Mills |
| 7,024,919 B2 | 4/2006 | Arima et al. |
| 7,062,830 B2 | 6/2006 | Alles |
| 7,516,649 B2 | 4/2009 | Locke et al. |
| 7,810,523 B2 | 10/2010 | McEwan et al. |
| 7,841,563 B2 | 11/2010 | Goossen et al. |
| 7,856,864 B2 | 12/2010 | McEwan et al. |
| 7,860,667 B2 | 12/2010 | Vogel et al. |
| 8,061,389 B2 | 11/2011 | McEwan |
| 8,185,244 B2 | 5/2012 | Wolfson |
| 8,235,777 B2 | 8/2012 | Stanimirovie |
| 2004/0181921 A1* | 9/2004 | Alles ................ F24F 3/0442 29/401.1 |
| 2005/0155367 A1* | 7/2005 | Shah ................ F24F 13/02 62/186 |
| 2011/0179854 A1 | 7/2011 | Brooks |
| 2011/0268510 A1 | 11/2011 | Thorn |
| 2012/0034568 A1 | 2/2012 | Pachner et al. |
| 2012/0080114 A1 | 4/2012 | McEwan |
| 2012/0118046 A1 | 5/2012 | Kato |
| 2012/0167670 A1 | 7/2012 | Bean, Jr. et al. |
| 2013/0005236 A1 | 1/2013 | Km et al. |

* cited by examiner

SYSTEM AND METHOD FOR MEASURING DUCT LEAKAGE IN A HVAC SYSTEM

CROSS REFERENCE TO RELATED APPLICATIONS

The present application is related to, and claims the priority benefit of, U.S. Provisional Patent Application Ser. No. 61/874,607 filed Sep. 6, 2013, the contents of which are hereby incorporated in their entirety into the present disclosure

TECHNICAL FIELD OF THE DISCLOSED EMBODIMENTS

The presently disclosed embodiments generally relate to heating, ventilation and air conditioning (HVAC) systems, and more particularly, to a system and method for measuring duct leakage in a HVAC system.

BACKGROUND OF THE DISCLOSED EMBODIMENTS

Generally, a duct leakage tester is a diagnostic tool designed to measure the airtightness of forced air heating, ventilating and air-conditioning (HVAC) ductwork. A duct leakage tester consists of a calibrated fan for measuring an air flow rate and a pressure sensing device to measure the pressure created by the fan flow. The combination of pressure and fan flow measurements are used to determine the ductwork airtightness. The airtightness of ductwork is useful knowledge when trying to increase energy conservation within a building such as a residential home.

Generally, a basic duct leakage testing system includes three components—a calibrated fan, a register sealing system and a device to measure fan flow and building pressure. Supply registers or return air grills are sealed using adhesive tapes, cardboard, or non-adhesive reusable seals. One register or return is left unsealed. The calibrated fan is then connected to that unsealed register. Pressure is monitored in one of the branches of the ductwork while the calibrated fan delivers air into the system. As air is delivered into the ductwork, pressure builds and forces air out of any holes in the various ductwork connections or through the seams and joints of the furnace or air-handler. The tighter the ductwork system (e.g. fewer holes), the less air required from the fan to create a change in the ductwork pressure.

However, this method of duct leakage testing requires administration by a certified person; therefore, this method is time consuming, complicated, and increases the overall cost of installation. There is, therefore, a need for a method to measure duct leakage that is less complicated and reduces overall installation cost.

SUMMARY OF THE DISCLOSED EMBODIMENTS

In one aspect, a method for measuring duct leakage in a HVAC system is provided. In one embodiment, the method includes the step of operating a processing device to determine a nominal static pressure. In one embodiment, the processing device determines the nominal static pressure by operating a blower system at a nominal airflow rate.

In one embodiment, the method includes the step of restricting airflow in each of the at least one supply air conduits, and each of the at least one return air conduits. In one embodiment, airflow is restricted by closing a supply register coupled to each of the at least one supply air conduits. In one embodiment, airflow is restricted by closing a return register coupled to each of the at least one return air conduits.

In one embodiment, the method includes the step of operating the processing to determine a first static pressure. In one embodiment, the processing device determines the first static pressure by operating the blower system at a first airflow rate.

In one embodiment, the method includes the step of operating the processing device to calculate a duct leakage airflow.

In one embodiment, the method includes operating the processing device to calculate a duct leakage measurement. In one embodiment, the duct leakage measurement includes a duct leakage rate. In one embodiment, the duct leakage measurement includes a duct leakage percentage.

In one aspect, an HVAC system for measuring duct leakage is provided. In one embodiment, the HVAC system includes an indoor unit assembly, at least one supply air conduit coupled to the indoor unit assembly, and at least one return air conduit coupled to the indoor unit assembly. In one embodiment, the indoor unit assembly is selected from a group consisting of: an air handler and a furnace. In one embodiment, the indoor unit assembly includes an indoor unit assembly control, and a blower system which includes a motor and a blower. In one embodiment, the motor includes a variable speed motor. In one embodiment, the indoor unit assembly is configured to circulate air through the at least one supply air conduit and the at least one return air conduit. In one embodiment, at least one supply register vent is coupled to each of the at least one supply air conduits, and at least one return register vent is coupled to each of the at least one return air conduits.

In one embodiment, HVAC system includes a processing device operably coupled to the indoor unit assembly. In one embodiment, the processing device include a system control element. In one embodiment, the processing is configured to determine a nominal static pressure. In one embodiment, the processing device determines the nominal static pressure by operating a blower system at a nominal airflow rate.

In one embodiment, the processing device is configured to calculate a first static pressure of the HVAC system. In one embodiment, the processing device is configured to calculate the first static pressure by operating the blower system at a first airflow rate.

In one embodiment, the processing device is configured to calculate a duct leakage airflow. In one embodiment, the processing device is configured to calculate a duct leakage measurement. In one embodiment, the duct leakage measurement includes a duct leakage rate. In one embodiment, the duct leakage measurement includes a duct leakage percentage.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
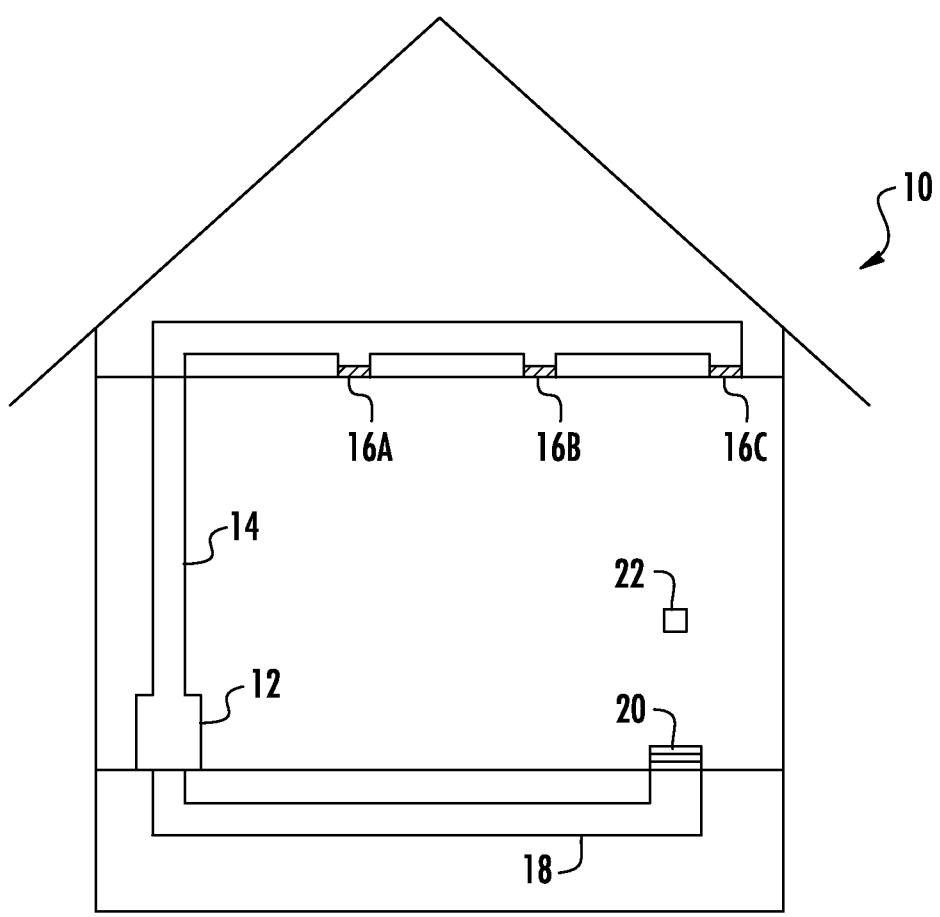
FIG. 1 schematically illustrates an HVAC system of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates an HVAC system 10 constructed in accordance with the present disclosure. In one embodiment, the HVAC system 10 includes an indoor unit assembly 12, and at least one supply air conduit 14 coupled to the indoor unit assembly 12. At least one supply register vent 16 is coupled to each supply air conduit 14. Three supply register vents 16A-C are shown in the illustrated embodiment. The HVAC system 10 includes at least one return air conduit 18 coupled to the indoor unit assembly 12. At least one return register vent 20 is coupled to the at least one return air conduit 18. The HVAC system 10 includes a system control element 22 operably coupled to the indoor unit assembly 12.

Figure 2:
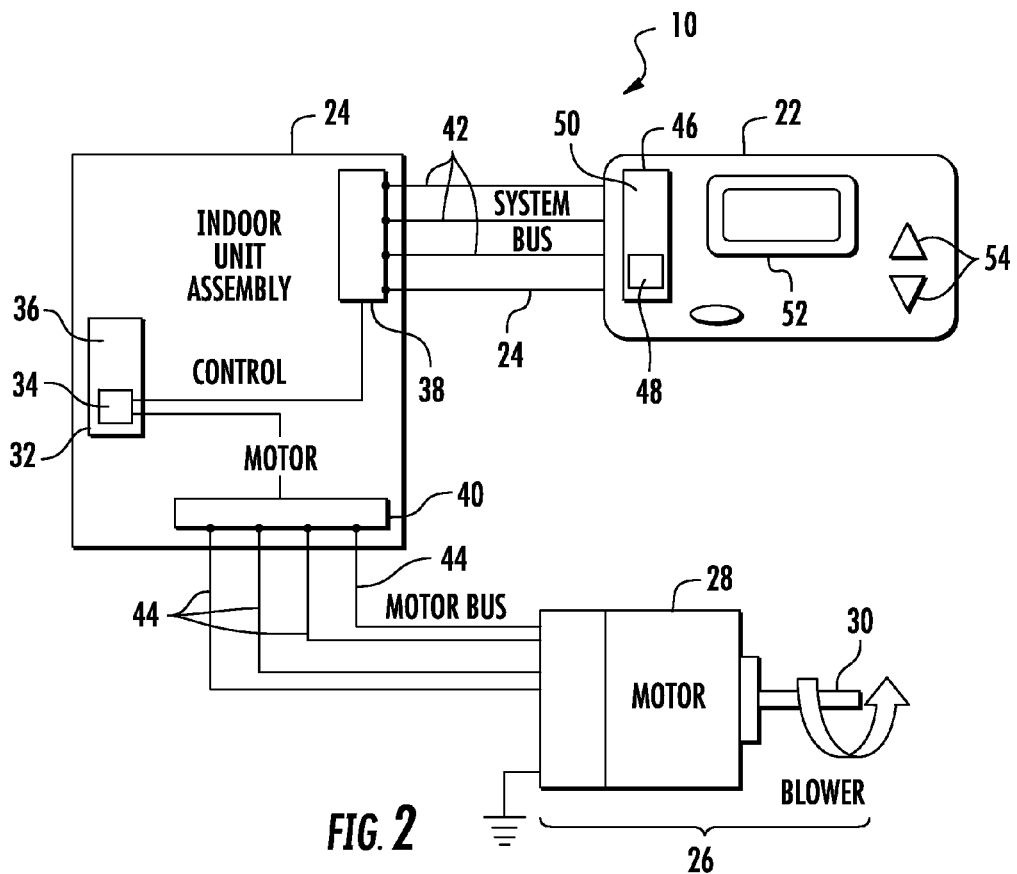
FIG. 2 is a component diagram of an HVAC system configured according to the present disclosure.

In one embodiment, as shown in FIG. 2, the indoor unit assembly 12 includes an indoor unit assembly control 24, and a blower system 26 which includes a motor 28 and a blower 30. The processing device 22 is shown in direct communication with the indoor unit assembly control 24, and the indoor unit assembly control 24 is shown in direct communication with the motor 28 of the blower system 26. In one embodiment, the processing device 22 includes a system control element.

In one embodiment, the indoor unit assembly control 24 includes an indoor unit assembly controller 32, which includes a first microprocessor 34 and a first memory 36 for storing certain operational characteristics particular to the given HVAC system 10. As shown, the indoor unit assembly controller 32 can be in communication with a model control and feedback circuit 38 and with a motor control and feedback circuit 40. The feedback circuit 38 serves to connect the indoor unit assembly control 24 to the processing device 22 by means of a system bus 42, and allows signals to be communicated between the indoor unit assembly control 24 and the processing device 22. Feedback circuit 40 connects the indoor unit assembly control 24 to the motor 28, and serves to transmit commands to, and receive operation feedback from, the motor 28 by means of a motor bus 44.

The blower system 26 includes a motor 28, which has an operational motor torque, and a blower 30, which has a blower diameter and an operational blower speed. The motor 28 serves to impel blades or other means of the blower (not shown) to move air through the at least one supply air conduit 14 and the at least one return air conduit 18 associated with HVAC system 10. In one embodiment, the motor 28 includes a variable speed motor. The motor 28 receives operation requests in the form of an operating airflow volume over the motor bus 44 from the indoor unit assembly control 24, and reports back its operating speed via the motor bus 44 to the indoor unit assembly control 24.

In one embodiment, the processing device 22 includes a computing element 46 that further includes a second microprocessor 48 and a second memory 50, and may be, for example, a computer, an electronic thermostat, or any other device with the capability of storing and reading input data, performing calculations, and reporting the results of calculations. In one embodiment, the processing device 22 includes a user interface element 52, such as a graphical user interface (GUI), a CRT display, a LCD display, or other means by which a user of the HVAC system 10 can be apprised of system status and/or particular characteristics of the system (such as static pressure). The processing device 22 also optionally has a user input element 54, such as a keypad, keyboard, or other data input means, which allows a user of the HVAC system 10 to change the operation of the HVAC system 10.

Figure 3:
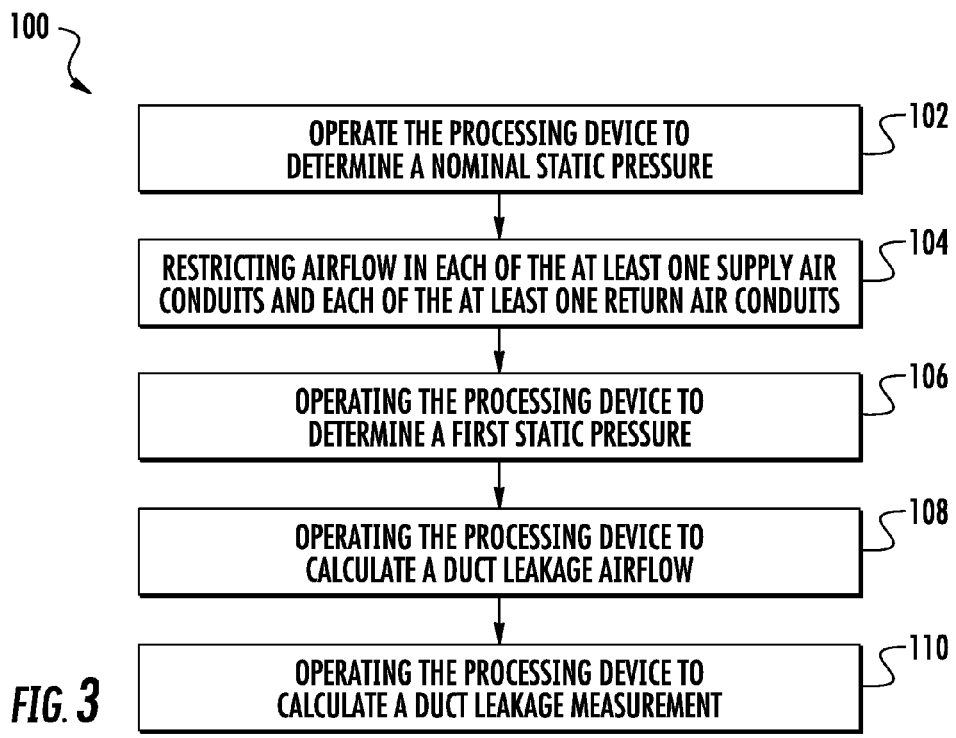
FIG. 3 is a schematic flow diagram of a method for measuring duct leakage in an HVAC system of the present disclosure.

FIG. 3 illustrates an exemplary method 100 for measuring duct leakage in an HVAC system 10. The method 100 includes the step 102 of operating the processing device 22 to determine a nominal static pressure. The nominal static pressure in a section of the HVAC system 10 external to the indoor unit assembly 12 is determined by the processing device 22 in one embodiment, although the determination of nominal static pressure could be performed at any number of locations in the HVAC system 10 that include processing devices, such as at the indoor unit assembly control 24. In order for processing device 22 to determine the nominal static pressure in the illustrative embodiment shown, processing device 22 first receives a value for system volume airflow rate (of air flowing through the HVAC system 10), and values for blower diameter and blower speed from the indoor unit assembly control 24 over the system bus 42. In one embodiment, the indoor unit assembly control 24 commands the blower system 26 to operate at a nominal airflow rate, for example a minimum airflow rate, to determine the nominal static pressure across the HVAC system 10. The values for system volume airflow rate, blower diameter, and blower speed could be stored in the second memory 50 of the processing device 22 long before calculation, though in some embodiments, these values, especially for system volume airflow rate and blower speed, are received at the processing device 22 from the indoor unit assembly control 24 contemporaneously, or nearly contemporaneously, with the determination of the nominal static pressure by the processing device 22. As is known in the art, the processing device 22 employs an algorithm including unit characteristic constants from the indoor unit assembly control 24 to determine the nominal static pressure external to the indoor unit assembly 12. For example, the indoor unit assembly control 24 commands the blower system 26 to operate at the nominal airflow rate, designated as $Q_{nom}$ in FIG. 4. The nominal airflow rate produces a nominal static pressure, designated as $ESP_{nom}$ in FIG. 4, across the HVAC system 10

In one embodiment, the method 100 includes the step 104 of restricting airflow in each of the at least one supply air conduits 14 and each of the at least one return air conduits 18. In one embodiment, airflow is restricted in each of the at least one supply air conduits 14 by closing each of the at least one supply register vents 16A-C, and airflow is restricted in each of the at least one return air conduits 18 by closing each of the at least one return register vents 20. It will be appreciated that airflow may also be restricted by temporarily covering each of the at least one supply register vents 16 and each of the at least one return register vents 20.

In one embodiment, the method 100 includes step 106 of operating the processing device 22 to determine a first static pressure. The first static pressure in a section of the HVAC system 10 external to the indoor unit assembly 12 is determined by the processing device 22, although the determination of first static pressure could be performed at any number of locations in the HVAC system 10, such as at the indoor unit assembly control 24. In order for the processing device 22 to determine the first static pressure in the illustrative embodiment shown, the processing device 22 first receives a value for system volume airflow rate (of air flowing through the HVAC system 10), values for blower diameter and blower speed from the indoor unit assembly control 24 over the system bus 42. In one embodiment, the indoor unit assembly control 24 commands the blower system 26 to operate at a first airflow rate to determine the first static pressure across the HVAC system 10 when the airflow is restricted. As is known in the art, the processing device 22 employs an algorithm including unit characteristic constants from the indoor unit assembly control 24 to determine the first static pressure external to the indoor unit assembly 12. For example, the indoor unit assembly control 24 commands the blower system 26 to operate at the first airflow rate, designated as $Q_1$ in FIG. 4. The first airflow rate produces a first static pressure, designated as $ESP_1$ in FIG. 4, across the HVAC system 10.

Figure 4:
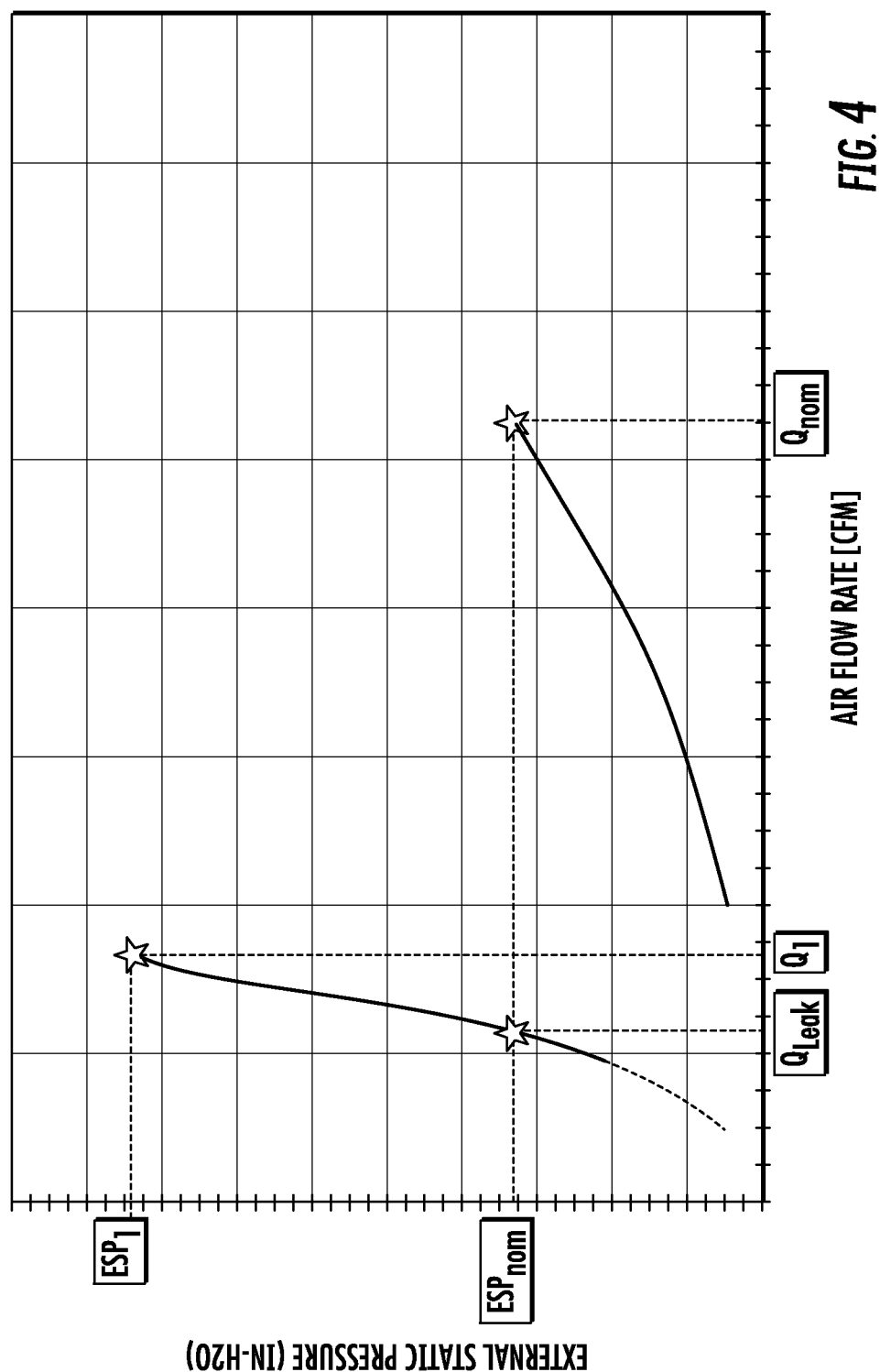
FIG. 4 is a graphical representation of one embodiment of a HVAC fan system curve according to the present disclosure.

In one embodiment, the method 100 includes step 108 of operating the processing device 22 to calculate a duct leakage airflow. In one embodiment, calculating a duct leakage airflow includes calculating a second airflow rate at the nominal static pressure. For example, the duct leakage airflow in the HVAC system 10 external to the indoor unit assembly 12 is determined by the processing device 22, though the determination of duct leakage airflow could be performed at any number of locations in the HVAC system 10, such as at the indoor unit assembly control 24. In order for the processing device 22 to determine the duct leakage airflow in the illustrative embodiment shown, the processing device 22 first computes the duct leakage airflow at the nominal static pressure of the HVAC system 10. The duct leakage airflow, designated as $Q_{leak}$ in FIG. 4, is computed using the formula:

$$Q_{leak} = Q_1 \times \sqrt{\frac{ESP_{nom}}{ESP_1}}$$

For example, in an HVAC system 10 where the nominal airflow of the blower system 26 is determined to be 1050 cubic feet per minute at a nominal static pressure of 0.66 inches water column, and the first airflow rate of the blower system 26 is determined to be 364 cubic feet per minute at a measured first static pressure of 1.69 inches water column, the system control element 22 computes the duct leakage airflow to be approximately 227 cubic feet per minute.

In one embodiment, the method 100 includes step 110 of operating the processing device 22 to calculate a duct leakage measurement. In one embodiment, the duct leakage measurement includes a duct leakage rate. In one embodiment, the duct leakage measurement includes a duct leakage percentage. For example, after calculating the duct leakage airflow, the system control element 22 then computes the duct leakage rate at the nominal static pressure using the formula:

Duct Leakage Rate=$2 \times Ql_{eak}$

After determining the duct leakage rate, the system control element may compute the duct leakage percentage using the formula:

Duct leakage percentage=$(2 \times Q_{leak}) \div Q$nom$\times 100$

For example, based on the duct leakage airflow calculated above, the system control element 22 computes the duct leakage rate at the nominal static pressure to be approximately 454 cubic feet per minute. The processing device 22 computes the duct leakage percentage to be approximately 43 percent.

It will be appreciated that the processing device 22 may determine the duct leakage measurement of the HVAC system 10 by determining the nominal static pressure from the nominal airflow rate, determining the first static pressure at the first static pressure; then, calculating a duct leakage airflow at the nominal static pressure and duct leakage percentage. It will also be appreciated that the steps disclosed herein can be implemented in any (or multiple) processing devices contained within the system, such as the processing device 22 and indoor unit assembly control 24.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for measuring duct leakage in an HVAC system including an indoor unit assembly including an indoor unit assembly control and a blower system, at least one supply air conduit coupled to the indoor unit assembly, at least one return air conduit coupled to the indoor unit assembly, and a processing device operably coupled to the indoor unit assembly, the method comprising:
    (a) circulating air through the at least one supply air conduit and the at least one return air conduit;
    (b) operating the processing device to determine a nominal static pressure;
    (c) restricting airflow in each of the at least one supply air conduits, and each of the at least one return air conduit;
    (d) operating the processing device to determine a static pressure of the HVAC system;
    (e) operating the processing device to calculate a duct leakage airflow, wherein the duct leakage airflow is determined in response to the nominal static pressure, the static pressure and the airflow; and
    (f) operating the processing device to calculate a duct leakage measurement wherein the duct leakage measurement is determined in response to the duct leakage airflow.

2. The method of claim 1, wherein the processing device comprises a system control element.

3. The method of claim 1, wherein step (c) comprises closing a register coupled to each of the at least one supply air conduits and each of the at least one return air conduits.

4. The method of claim 1, wherein step (a) further comprises operating the indoor unit assembly control to operate the blower system at a nominal airflow rate.

5. The method of claim 1, wherein step (a) further comprises operating the indoor unit assembly control to operate the blower system at a first airflow rate.

6. The method of claim 1, wherein the blower system comprises a motor and a blower.

7. The method of claim 6, wherein the motor comprises a variable speed motor.

8. The method of claim 1, wherein the duct leakage airflow is calculated using the formula:

$Q_{leak}=Q1 \times \text{sqrt}(ESP_{nom} \div ESP1)$.

9. The method of claim 1, wherein the duct leakage measurement comprises a duct leakage rate.

10. The method of claim 9, wherein the duct leakage measurement comprises a duct leakage percentage.

11. The method of claim 10, wherein the duct leakage percentage is calculated using the formula:

Duct leakage percentage=$(2 \times Q_{leak}) \div Q_{nom} \times 100$.

12. The method of claim 9 wherein the duct leakage rate is calculated using the formula:

Duct leakage rate=$2 \times Q_{leak}$.

13. An HVAC system comprising:
an indoor unit assembly comprising:
an indoor unit assembly control; and
a blower system configured to circulate air;
a processing device operably coupled to the indoor unit assembly;
at least one supply air conduit coupled to the indoor unit assembly, the at least one supply air conduit configured to distribute the air; and
at least one return air conduit coupled to the indoor unit assembly; wherein the processing device is configured to:
(a) determine a nominal static pressure when the blower system operates at a nominal airflow rate;
(b) determine a static pressure when the blower system operates at a first airflow rate, the first airflow rate different than the nominal airflow rate;
(c) calculate a duct leakage airflow, wherein the duct leakage airflow is determined in response to the nominal static pressure, the static pressure and the first airflow rate; and
(d) calculate a duct leakage measurement, wherein the duct leakage measurement is determined in response to the duct leakage airflow.

14. The HVAC system of claim 13, further comprising a register coupled to each of the at least one supply air conduits, and each of the at least one return air conduits.

15. The HVAC system of claim 13, wherein the indoor unit assembly is selected from the group consisting of: an air handler and a furnace.

16. The HVAC system of claim 13, wherein the processing device comprises a system control element.

17. The HVAC system of claim 13, wherein the blower system comprises a motor and a blower.

18. The HVAC system of claim 17, wherein the motor comprises a variable speed motor.

19. The HVAC system of claim 13, wherein the indoor unit assembly control is to operate the blower system at the nominal airflow rate.

20. The HVAC system of claim 13, wherein the indoor unit assembly control is to operate the blower system at first airflow rate.

21. The HVAC system of claim 13, wherein the processing device calculates the duct leakage airflow using the formula:

$Q_{leak} = Q_1 \times \text{sqrt}(ESP_{nom} \div ESP_1)$.

22. The HVAC system of claim 13, wherein the duct leakage measurement comprises a duct leakage rate.

23. The HVAC system of claim 22, wherein the duct leakage measurement comprises a duct leakage percentage.

24. The HVAC system of claim 23, wherein the duct leakage percentage is calculated using the formula:

Duct leakage percentage=$(2 \times Q_{leak}) \div Q_{nom} \times 100$.

25. The HVAC system of claim 22, wherein the duct leakage rate is calculated using the formula:

Duct leakage rate=$2 \times Q_{leak}$.

* * * * *